US008361360B2

(12) United States Patent
Vogeleer et al.

(10) Patent No.: US 8,361,360 B2
(45) Date of Patent: Jan. 29, 2013

(54) METHOD FOR CONTROLLING A TABLET PRESS

(75) Inventors: Jan Vogeleer, Bornem (BE); Ivo Van Den Mooter, Willebroek (BE); Jurgen Boeckx, Steenokkerzeel (BE); Wouter Happaerts, Walem (BE)

(73) Assignee: Courtoy NV, Halle (BE)

( * ) Notice: Subject to any disclaimer, the term of this patent is extended or adjusted under 35 U.S.C. 154(b) by 762 days.

(21) Appl. No.: 12/300,955

(22) PCT Filed: May 15, 2006

(86) PCT No.: PCT/IB2006/001261

§ 371 (c)(1),
(2), (4) Date: Oct. 29, 2009

(87) PCT Pub. No.: WO2007/132281

PCT Pub. Date: Nov. 22, 2007

(65) Prior Publication Data

US 2010/0038808 A1 Feb. 18, 2010

(51) Int. Cl.

| | |
|---|---|
| ***B29C 45/76*** | (2006.01) |
| ***B29C 47/92*** | (2006.01) |
| ***B29C 43/00*** | (2006.01) |
| ***B29C 59/00*** | (2006.01) |
| *B28B 5/00* | (2006.01) |

(52) U.S. Cl. .................... 264/40.4; 264/40.1; 264/40.5; 264/120; 425/353

(58) Field of Classification Search .................. 425/353
See application file for complete search history.

(56) References Cited

U.S. PATENT DOCUMENTS

| | | | |
|---|---|---|---|
| 2,846,723 | A | 8/1958 | Frank et al. |
| 2,921,339 | A | 1/1960 | Pitzer |
| 3,579,217 | A | 5/1971 | Casey et al. |
| 3,791,205 | A | 2/1974 | Hooker |
| 4,099,239 | A | 7/1978 | Williams |
| 4,100,598 | A | 7/1978 | Stiel et al. |
| 4,121,289 | A | 10/1978 | Stiel |
| 4,570,229 | A | 2/1986 | Breen et al. |
| 4,817,006 | A | 3/1989 | Lewis |
| 5,211,964 | A | 5/1993 | Prytherch et al. |
| 5,322,655 | A | 6/1994 | Ebey |

(Continued)

FOREIGN PATENT DOCUMENTS

| | | |
|---|---|---|
| DE | 25 50 680 A1 | 9/1976 |
| DE | 198 28 004 A1 | 1/2000 |

(Continued)

OTHER PUBLICATIONS

Japanese Office Action JPA 2009-510559; Oct. 19, 2011.

(Continued)

*Primary Examiner* — Christina Johnson
*Assistant Examiner* — Benjamin Schiffman
(74) *Attorney, Agent, or Firm* — Sughrue Mion, PLLC

(57) ABSTRACT

A method for controlling a tablet press comprises the steps of consecutively supplying material into each die of a die table 1, subjecting the material to a pre-compression and a main-compression, whereby the main-compression is performed under substantially constant compression force and variable resulting tablet thickness of the individual tablets, and measuring a weight value representative of the weight of the material fed into the die. The quantity of material supplied to each die is regulated on the basis of a deviation between a previously measured weight value and a first set value. The weight value is measured during pre-compression of the material located in each die. A rotary tablet press is also disclosed.

15 Claims, 5 Drawing Sheets

U.S. PATENT DOCUMENTS

| | | | |
|---|---|---|---|
| 5,838,571 | A | 11/1998 | Lewis |
| 6,319,435 | B1 | 11/2001 | Hinzpeter et al. |
| 6,325,609 | B1 | 12/2001 | Shimada |

FOREIGN PATENT DOCUMENTS

| | | | |
|---|---|---|---|
| DE | 19955196 | | 5/2001 |
| EP | 0 698 481 | | 2/1996 |
| EP | 1 584 454 | A2 | 10/2005 |
| GB | 1 475 272 | | 6/1977 |
| GB | 1 534 061 | | 11/1978 |
| GB | 2 021 978 | A | 12/1979 |
| GB | 2 123 989 | A | 2/1984 |
| JP | 03155499 | A | 7/1991 |
| JP | 637639 | A | 5/1994 |
| JP | 2941226 | B2 | 6/1999 |
| JP | 2004084832 | A | 3/2004 |
| WO | WO 86/05743 | | 10/1986 |
| WO | WO 97/27044 | | 7/1997 |

OTHER PUBLICATIONS

Patent Abstracts for Japan, Patent No. JP 61111800;May 29, 1986; Hata Tekkosho:KK.

Patent Abstracts of Japan, Patent No. JP 61111799; May 29, 1986; Hata Tekkosho:KK.

Bi-layer tablets—why special technology is required, Niro Pharma Systems; by Jan Vogleleer; GEA Process Engineering Division, 2002.

METHOD FOR CONTROLLING A TABLET PRESS

The present invention relates to a method for controlling a tablet press, whereby powder or granular material is compressed in dies arranged circumferentially in a rotary die table by means of reciprocating punches, said method comprising the steps:

consecutively supplying a quantity of material to be compressed into each die, subjecting the quantity of material located in each die to a pre-compression and subsequently a main-compression, whereby the main-compression is performed under substantially constant compression force and variable resulting tablet thickness of the individual tablets, measuring a weight value of a parameter representative of the weight of the quantity of material fed into the die, regulating the quantity of material supplied to each die on the basis of a deviation between a previously measured weight value and a first set value.

EP 1 584 454 A2 (Courtoy N V) describes a method for controlling a rotary tablet press, whereby, during the main-compression, a hardness value of the tablet resulting from the compression is measured, and whereby the degree of compression that the quantity of material located in each die is subjected to during main-compression is regulated on the basis of a deviation between a previously measured hardness value and a set value for the hardness. In this way, the mean tablet hardness of the produced tablets may be maintained within certain desired limits, although the resulting hardness of the individual tablets will vary slightly, which is indeed satisfactorily in most applications.

DE 198 28 004 B4 describes a method for obtaining a constant compression force in a tablet press having computer controlled and by means of step motors adjustable compression rollers, whereby one of the compression rollers during each single compression of a tablet is positioned by positive and negative displacements, so that a predetermined maximum compression force is maintained constant during a defined time. However, the document is silent about, how the amount of the necessary displacement of a compression roller is determined, and how it is determined, whether the displacement should be positive or negative. Because the necessary displacement is dependent on powder properties, it is necessary to determine the compression behaviour of each specific powder to be compressed, and this is in practice a mayor disadvantage. In any case, the real-time control of the position of the compression rollers by means of step motors would be a very expensive solution.

Furthermore, an industrial pellet press is known, whereby the main-compression is performed under substantially constant compression force and variable resulting pellet thickness of the individual pellets, and whereby the weight of the produced pellets is controlled by regulating the quantity of material supplied to each die on the basis of a measured value corresponding to the pellet thickness resulting from the main-compression of a previously produced pellet. However, although the hardness of the resulting pellets is very consistent, the weight control is not accurate enough for a pharmaceutical tablet press.

The object of the present invention is to provide a method for controlling a tablet press, whereby consistent tablet properties in terms of weight as well as hardness may be obtained.

In view of this object, the method according to the invention is characterized by measuring the weight value during pre-compression of the quantity of material located in each die.

By measuring the weight value during pre-compression, a more accurate measurement and consequently a more accurate weight control may be obtained. The measurement of a weight value during main-compression at constant compression force is less accurate than a measurement of a weight value during pre-compression, because the powder or granular material has already been compressed during pre-compression. Consequently, according to the invention, the weight may be controlled very accurately, and at the same time the density and thereby the hardness of the individual tablets may be maintained consistent.

This is very advantageous, especially if applied to a pharmaceutical tablet press, because in such a press controlling both weight and hardness is of great importance. A consistent tablet hardness means consistent disintegration and dissolution of the tablets when swallowed, so that a consistent release profile and hence bioavailability of the produced tablets may be obtained.

In an embodiment, the weight value corresponds substantially to a thickness of a tablet during pre-compression of said tablet under substantially constant compression force. At pre-compression, the compression force is relatively small, and therefore the measurement of a value corresponding to the thickness of a tablet gives a rather accurate measurement of the weight of the tablet. Because both the pre-compression and the main-compression of each tablet is performed under substantially constant compression force, the resulting density and therefore also the hardness of the individual tablets will be even more constant. A more constant tablet hardness means more constant disintegration and dissolution of the tablet when swallowed, so that a substantially constant release profile and hence bioavailability of the produced tablets may be obtained.

In an embodiment, the compression force of the pre-compression is maintained substantially constant by means of a pre-compression piston arranged displaceably in a gas cylinder, whereby the gas cylinder is supplied with compressed gas, and whereby the gas pressure in the gas cylinder is maintained substantially constant by means of a pressure regulator. By providing a suitable gas volume in the gas cylinder or in a separate vessel connected with this, the displacements of the piston will in practice hardly change the gas pressure in the gas cylinder, and consequently, the compression force will be maintained substantially constant in real time when the piston is moving without any response time of a computer control loop implicated.

In an embodiment, the powder or granular material is compressed in the die between opposed first and second punches, each punch having first and second ends, whereby said first punch ends are received in the die, and said second punch ends, during pre-compression, interact with first and second pre-compression rollers, respectively, whereby, during the pre-compression, the first pre-compression roller is displaced in the axial direction of the punches and the second pre-compression roller is fixed in said direction, and whereby the first pre-compression roller is carried by the pre-compression piston.

In an embodiment, the weight value corresponds substantially to a pre-compression displacement value representative of a displacement of the first pre-compression roller during pre-compression.

In an embodiment, the weight value corresponds substantially to the maximum compression force exerted by a punch on a tablet during pre-compression of said tablet to a predetermined tablet thickness.

In an embodiment, the compression force of the main-compression is maintained substantially constant by means of a main-compression piston arranged displaceably in a gas cylinder, whereby the gas cylinder is supplied with compressed gas, and whereby the gas pressure in the gas cylinder is maintained substantially constant by means of a pressure regulator. By providing a suitable gas volume in the gas cylinder or in a separate vessel connected with this, the displacements of the piston will in practice hardly change the gas pressure in the gas cylinder, and consequently, the compression force will be maintained substantially constant in real time when the piston is moving without any response time of a computer control loop implicated.

In an embodiment, the movement of the main-compression piston is stopped by a dampening force after each main-compression. Thereby, the rotational speed of the die table may be increased without increasing noise and vibrations.

In an embodiment, the dampening force is produced by a chamber containing compressed gas. The dampening force may thereby be varied by varying the pressure of the compressed gas.

In an embodiment, the chamber containing compressed gas is a hollow ring of elastic material located between the main-compression piston and an abutment.

In an embodiment, the dampening force is provided by a dampening piston arranged in a cylinder containing compressed gas. Thereby, the dampening force may be varied continuously by varying the pressure of the compressed gas, for instance by means of a pressure regulator connected with the cylinder.

In an embodiment, the dampening force is provided by a spring element.

In an embodiment, the dampening force is provided by an elastic O-ring located between the main-compression piston and an abutment.

In an embodiment, the dampening force is provided by an elastic ring having rectangular cross-section and being located between the main-compression piston and an abutment.

In an embodiment, the powder or granular material is compressed in the die between opposed first and second punches, each punch having first and second ends, whereby said first punch ends are received in the die, and said second punch ends, during main-compression, interact with first and second main-compression rollers, respectively, whereby, during the main-compression, the first main-compression roller is displaced in the axial direction of the punches and the second main-compression roller is fixed in said direction, and whereby the first main-compression roller is carried by the main-compression piston. In this way, without having to decrease the rotational speed of the die table, the dwell time of the tablets during main-compression may be increased, when compared to a prior art tablet press having fixed position of the main-compression rollers during compression. Increased dwell time may be advantageous in order to obtain greater tablet hardness. Furthermore, the formulation of the powder or granular material to be compressed may be reworked in order to improve the flowability of the material, whereby the lower compressibility that is the consequence of an improved flowability is compensated for by the increased dwell time. It is noted that flowability is inversely proportional to compressibility. The improved flowability of the material is an advantage during handling of the material upstream the die table of the tablet press.

In addition, a lower risk of tablet capping or tablet laminating may be obtained: an increase in dwell time will give more plastic deformation, because plastic deformation is time dependent. This plastic deformation will in turn increase the tablet strength, so that it can better withstand the elastic recovery after ejection of the tablet. By increasing the plastic deformation the ratio between plastic deformation and brittle fracture will become higher. Consequently, because too much deformation by brittle fracture might give capping and laminating problems, increasing the plastic deformation will give lesser capping or laminating problems.

Increasing the dwell time may give a better deaeration of the powder bed and a better, more uniform particle rearrangement at compression. This in turn will give less stress concentrations in the tablet. Less stress concentrations in the tablets will result in less tablets breaking in processing equipment downstream the tablet press, such as a tablet coater. This will in turn give less batch rejections. Less stress concentrations will also give less tablets breaking in packaging equipment, like blister lines, and this will lead to lesser machine downtime and a higher productivity.

Alternatively to increasing the dwell time, the rotational speed of the die table may be increased to arrive at the same dwell time as for the above mentioned prior art tablet press. Thereby, the production output rate may be increased.

The dwell time is the time during which the compression force is at its maximum. In a prior art tablet press having fixed position of the main-compression rollers during compression, the dwell time is consequently the time during which the flat end part of the second punch end rolls on the periphery of the main-compression roller and is therefore limited by the diameter of the flat end part. On the contrary, in a tablet press as described above, whereby the first main-compression roller is displaced during compression, the dwell time starts when the compression force balances the gas pressure in the gas cylinder, and the piston starts to move, which is before the flat end part of the second punch end starts rolling on the periphery of the main-compression roller. Correspondingly, the dwell time ends, when the piston stops moving and hits the abutment, after the flat end part of the second punch end has stopped rolling on the periphery of the main-compression roller. Therefore, in this case, the dwell time is not limited by the diameter of the flat end part.

In case of problematic tablet formulations, an increased dwell time or a faster rotational speed of the die table may be an advantage.

In an embodiment, a main-compression displacement value representative of a displacement of the first main-compression roller during main-compression is measured, and the position of the second main-compression roller in said direction is regulated on the basis of a deviation between a previously measured main-compression displacement value and a second set value. The more the first main-compression roller is displaced during compression, the larger dwell time is obtained, provided that the rotational speed of the die table is maintained constant. By regulating the position of the second main-compression roller, it is possible to regulate the resulting displacement of the first main-compression roller and thereby to regulate the dwell time. Thereby, the above-mentioned tablet properties dependent on the dwell time may be controlled, so that more predictable results are possible.

In an embodiment, said position regulation of the second main-compression roller is based on a mean value of several single measured main-compression displacement values. Thereby, fluctuations of the measured main-compression displacement value will not cause the control loop to overreact; instead, corrections to the position of the second main-compression roller will be based on progressive deviations registered by the control loop.

In an embodiment, the position of the second main-compression roller is maintained constant as long as said mean value of the main-compression displacement value falls within preset correction tolerance limits. This will further prevent a possible tendency of the control loop to overreact, as corrections will only be performed when a measured value falls outside the preset limits.

In an embodiment, the position of the second main-compression roller is regulated so that the resulting main-compression displacement value is maintained substantially constant. Thereby, the dwell time will also be maintained substantially constant, whereby the above-mentioned tablet properties dependent on the dwell time will be substantially constant.

The present invention further relates to a rotary tablet press comprising a housing and a rotary die table having a number of dies arranged circumferentially, each die being associated with first and second punches, each punch having first and second ends, said first punch ends being receivable in the die and arranged for compression of a powder or granular material in the die, the housing comprising a feeding device for the supply of material to be compressed into the dies, a tablet discharge device for removal of compressed material in the form of tablets, and at least one pre-compression station and at least one main-compression station, each said compression station being provided with first and second compression rollers adapted to interact with the second punch ends, respectively, in order to perform compression of material located in the dies by reciprocation of the punches, the first main-compression compression roller of the main-compression station being supported by means of a main-compression piston arranged displaceably in a gas cylinder, the gas cylinder being connected to a supply of compressed gas, and a pressure regulator being adapted to maintain the gas pressure in the gas cylinder substantially constant, the housing comprising a weight transducer for measuring a weight value of a parameter representative of the weight of a quantity of material fed into the die, a powder quantity regulator being provided for regulation of the quantity of material supplied to each die by the feeding device on the basis of a deviation between a previously measured weight value and a first set value.

The rotary tablet press according to the invention is characterized in that the weight transducer is comprised by the pre-compression station. Thereby, the above-mentioned advantages may be achieved.

In an embodiment, the first compression roller of the pre-compression station is supported by means of a piston arranged displaceably in a gas cylinder, whereby the gas cylinder is connected to a supply of compressed gas, and whereby a pressure regulator is adapted to maintain the gas pressure in the gas cylinder substantially constant. Because both the pre-compression and the main-compression of each tablet is performed under substantially constant compression force, the resulting density and therefore also the hardness of the individual tablets will be even more constant. Thereby, a substantially constant release profile and hence bioavailability of the produced tablets may be obtained.

In an embodiment, the weight transducer of the pre-compression station has the form of a displacement transducer for measuring a pre-compression displacement value representative of a displacement of the piston in the gas cylinder. At pre-compression, the compression force is relatively small, and therefore the measurement of a value corresponding to the thickness of a tablet gives a rather accurate measurement of the weight of the tablet.

In an embodiment, a dampening element is provided between the piston of the main-compression station and an abutment. Thereby, the above-mentioned advantages may be achieved.

In an embodiment, the dampening element has the form of a chamber containing compressed gas. Thereby, the above-mentioned advantages may be achieved.

In an embodiment, the chamber containing compressed gas is a hollow ring of elastic material. Thereby, the above-mentioned advantages may be achieved.

In an embodiment, the dampening element has the form of a dampening piston arranged in a cylinder containing compressed gas. Thereby, the above-mentioned advantages may be achieved.

In an embodiment, the dampening element has the form of a spring element. Thereby, the above-mentioned advantages may be achieved.

In an embodiment, the dampening element has the form of an elastic O-ring. Thereby, the above-mentioned advantages may be achieved.

In an embodiment, the dampening element has the form of an elastic ring having rectangular cross-section.

In an embodiment, the main-compression station comprises a displacement transducer for measuring a main-compression displacement value representative of a displacement of the piston in the gas cylinder, and a position regulator for regulation of the position of the second main-compression roller on the basis of a deviation between a previously measured main-compression displacement value and a second set value. Thereby, the above-mentioned advantages may be achieved.

In an embodiment, said position regulator is adapted to regulate the position of the second main-compression roller on the basis of a mean value of several single measured main-compression displacement values. Thereby, the above-mentioned advantages may be achieved.

In an embodiment, said position regulator is adapted to maintain the position of the second main-compression roller constant as long as said mean value of the main-compression displacement value falls within preset correction tolerance limits. Thereby, the above-mentioned advantages may be achieved.

In an embodiment, the first main-compression roller of the main-compression station is located above the rotary die table. This is advantageous, if the space below the rotary die table is limited.

In an embodiment, the pressure regulator is adapted to maintain the gas pressure in the gas cylinder at or below 30 bars. Thereby, a simpler and consequently cheaper pressure regulator may be employed.

In an embodiment, the total weight of the first main-compression roller, the main-compression piston, a yoke carrying the first main-compression roller and supplementary parts displaceable with the main-compression piston is less than 30 kg. Thereby, the rotational speed of the die table may be further increased without increasing noise and vibrations.

The invention will now be explained in more detail below by means of examples of embodiments with reference to the very schematic drawing, in which FIG. 1 shows in diagrammatic form an embodiment of a rotary tablet press with a control system according to the invention.

Figure 1:
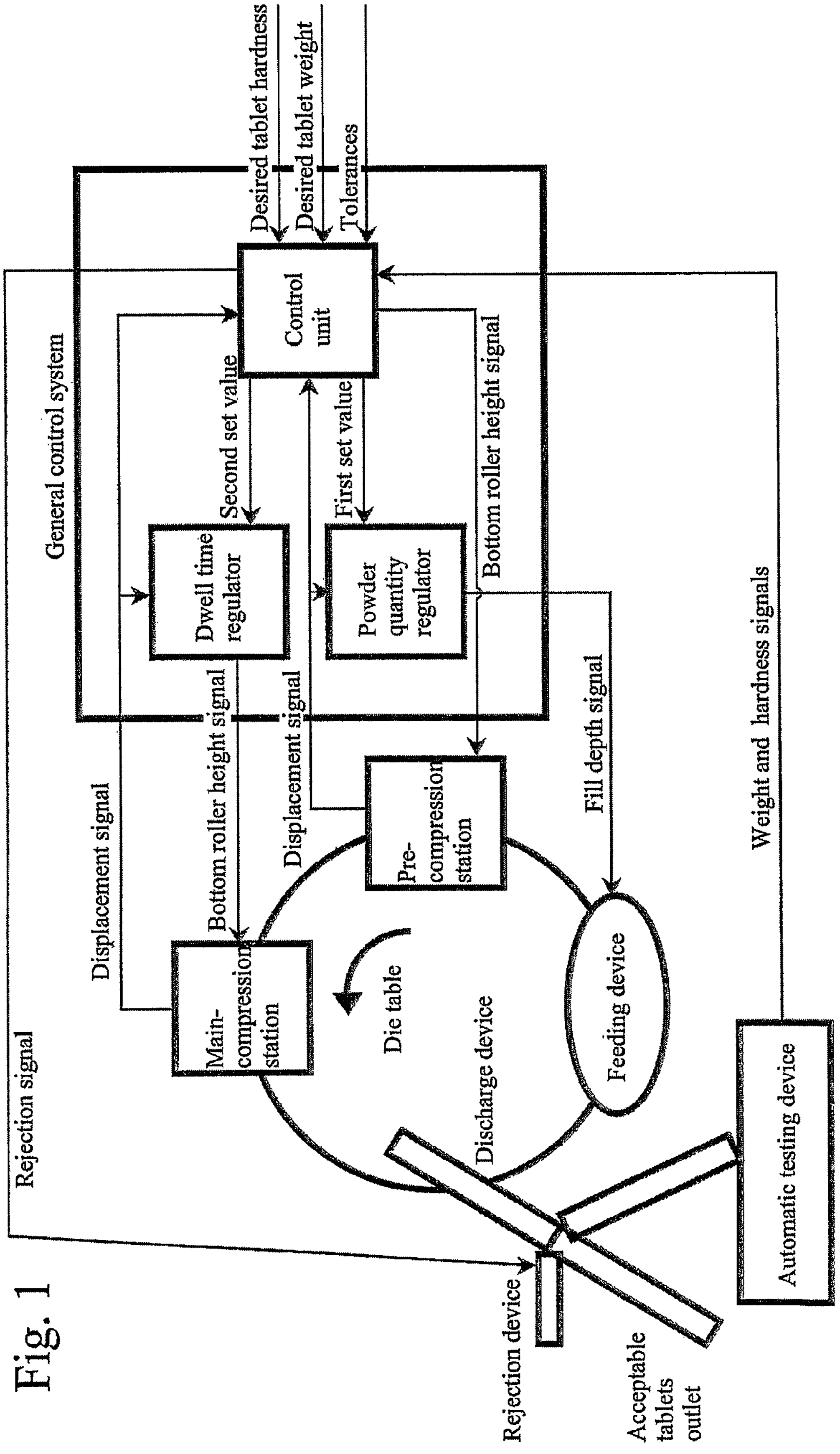

FIG. 1 shows in diagrammatic form an embodiment of a rotary tablet press with a control system according to the invention. The tablet press has a rotary die table 1 for compression of a feedstock in the form of powder or granular material into tablets, compacts or the like. The press is of a type suitable for use in the pharmaceutical industry, but the press according to the invention may as well be a so-called industrial press employed in the production of a variety of different products, such as vitamins, pet food, detergents, explosives, ceramics, batteries, balls, bearings, nuclear fuels, etc.

The tablet press is provided with a feeding device in the form of a well-known double rotary feeder with two not shown rotary paddles located in a feeder housing and driven by means of separate drive motors providing for independent speed setting of the paddles. The feeder housing is open against the die table so that the paddles may ensure proper filling of the dies with feedstock. Other feeding systems may also be employed, such as a so-called gravity feeder or a vibration feeder.

Figure 2:
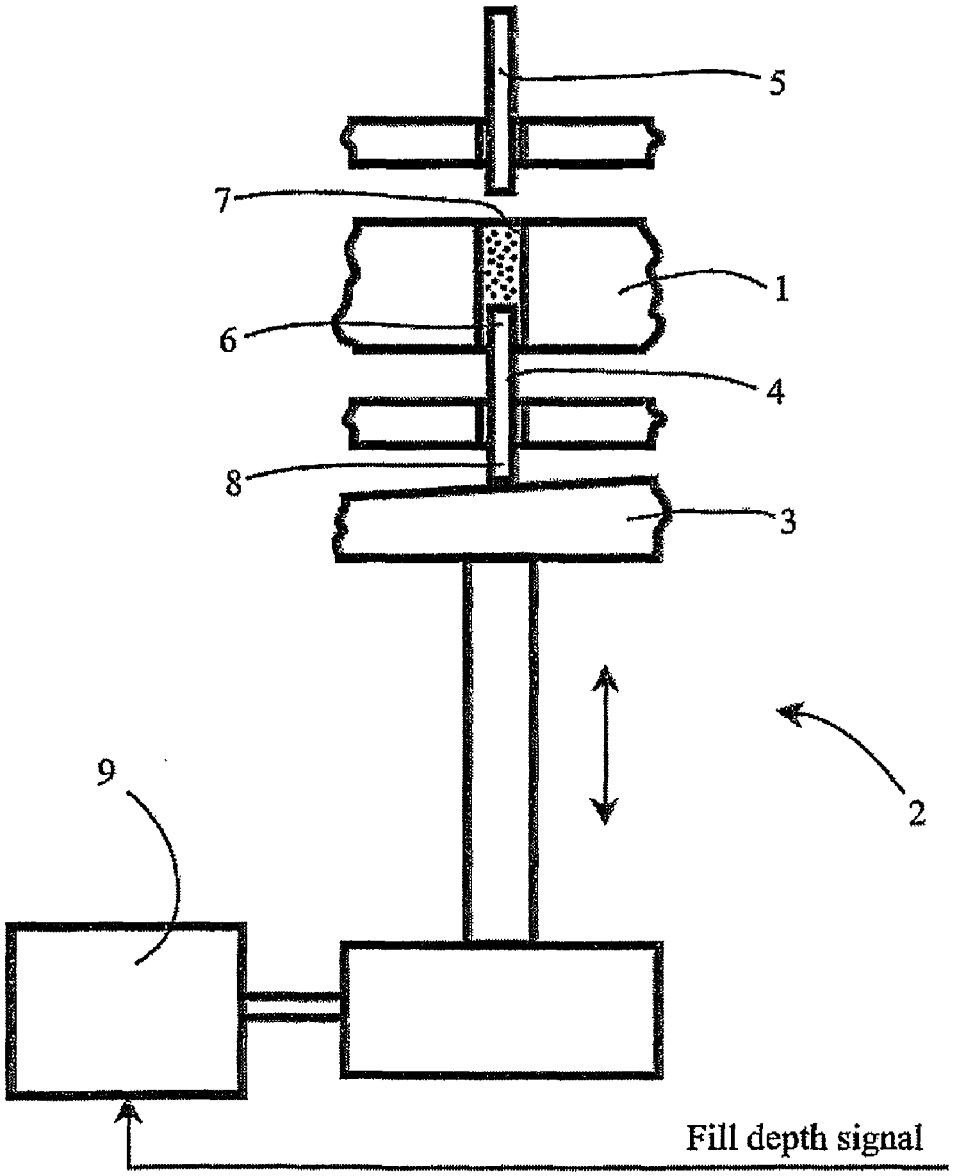
FIG. 2 is a side view of a part of the feeding device of FIG. 1.

FIG. 2 shows a fill depth adjusting device 2 which in this description will be considered as a part of the feeding device. The rotary feeder itself is not shown in FIG. 2. The fill depth adjusting device 2 comprises a vertically displaceable cam 3 determining the vertical position of lower punches 4 at the feeding device, thereby determining the fill depth of the die. The fill depth determines in a manner known per se the quantity of material left in the dies for compression. The lower punches 4 have first ends 6 received in corresponding dies 7 of the die table 1 and second ends 8 sliding on the vertically displaceable cam 3. Upper punches 5 are maintained outside the dies 7 at this stage in order to permit filling of the dies. The vertical position of the cam 3 is adjusted by means of a linear actuator 9 in accordance with a fill depth signal received from a powder quantity regulator shown in FIG. 1.

Figure 3:
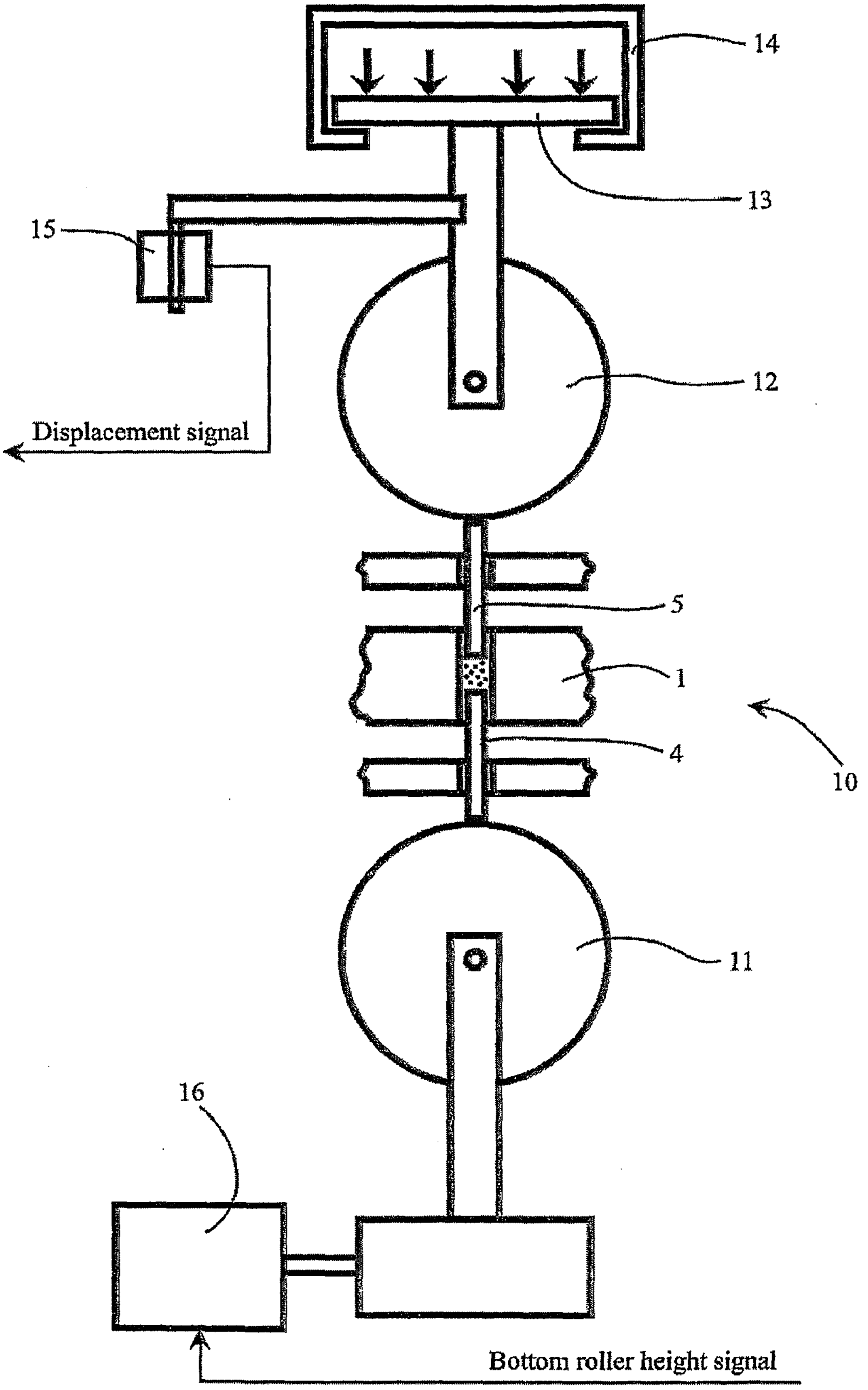
FIG. 3 is a side view of the pre-compression station of FIG. 1.

FIG. 3 shows a pre-compression station 10 comprising a lower compression roller 11 and an upper compression roller 12. The upper compression roller 12 is suspended in a piston 13 vertically displaceable within a gas cylinder 14. The gas pressure in the gas cylinder 14 is maintained constant by means of a not shown regulation system. In particular, the regulation system comprises a not shown air reservoir that is so large that limited displacements of the piston 13 within the gas cylinder 14 will, in practise, not affect the pressure in the gas cylinder 14. The air reservoir may, for instance, have a volume of 1 liter and the total system including the gas cylinder 14 may then, for instance, have a total volume of 1.5 liters. The vertical position of the piston 13 is measured by means of a displacement transducer 15, such as a LVDT (Linear Variable Differential Transformer). When an upper punch 5 passes under the centre of the upper compression roller 12, the displacement transducer 15 measures a displacement substantially corresponding to the thickness of the tablet after the pre-compression. Because the compression is being performed with a constant force being applied to the upper punch 5 by means of the piston 13, the displacement measured by the displacement transducer 15 corresponds to the weight of the tablet compressed and thereby constitutes a weight value. At each pre-compression of a tablet, the displacement measured by the displacement transducer 15 is transferred in the form of a displacement signal to the powder quantity regulator and the control unit; see FIG. 1. Because the displacement at pre-compression is greater than at main-compression, a better sensitivity of the control loop is obtained by measuring the displacement at pre-compression instead of at main-compression.

In the control unit, the displacement signal supplied for each tablet produced is compared with predetermined rejection tolerance limits defining the maximum acceptable deviation from a desired tablet weight. If the displacement signal for a tablet falls outside the rejection tolerance limits, a rejection signal is sent from the control unit to a rejection device associated with a tablet discharge device, and the tablet is separated from the remaining tablets, when it reaches the rejection device, see FIG. 1.

In the powder quantity regulator, a rigid or floating mean value of the displacement signal for several consecutive tablets is compared with a first set value that corresponds to a calibrated desired tablet weight and is received from the control unit. If the deviation falls outside preset first correction tolerance limits, the fill depth signal supplied to the feeding device is corrected correspondingly. Said correction tolerance limits may be calculated automatically by a general control system on the basis of user defined acceptable deviations, for instance in the form of percentage values, from the desired tablet weight.

From the tablet discharge device the tablets are fed to an automatic testing device, for example a Kraemer Electronic Tablet Tester, in which the weight and hardness of a number of sample tablets are determined periodically, and whereby corresponding weight and hardness signals are transferred to the control unit, see FIG. 1. In the control unit, the weight signal received from the automatic testing device is compared with the desired tablet weight, and on the basis of the deviation between these values, a bottom roller height signal is generated and transferred to the pre-compression station. In the pre-compression station, the bottom roller height signal is fed into a linear actuator 16, which adjusts the height of the bottom compression roller 11 correspondingly; see FIG. 3. As a result, the powder quantity regulator registers the change and adapts thereto. In an alternative embodiment, the vertical position of the air cylinder 14 could be adjusted by means of a linear actuator. Thereby, the powder quantity regulation loop is re-calibrated on the basis of the actual tablet weights of the sampled tablets measured by the automatic testing device. It should be noted that said re-calibration could also be performed by adjustment of the first set value supplied to the powder quantity regulator by the control unit or by adjustment of the otherwise constant air pressure in the air cylinder 14. Furthermore, instead of using an automatic testing device, a number of sample tablets may be tested manually, and a measured weight and possibly hardness may then be entered in the general control system.

Alternatively, the pre-compression station 10 may have a fixed distance between the lower compression roller 11 and the upper compression roller 12, and the displacement transducer 15 may then be replaced by a strain gauge provided on the shaft of one of the compression rollers 11, 12 and by means of which a force signal is supplied to the powder quantity regulator and the control unit. The force signal then constitutes the weight value representative of the weight of the quantity of material fed into the die.

Figure 4:
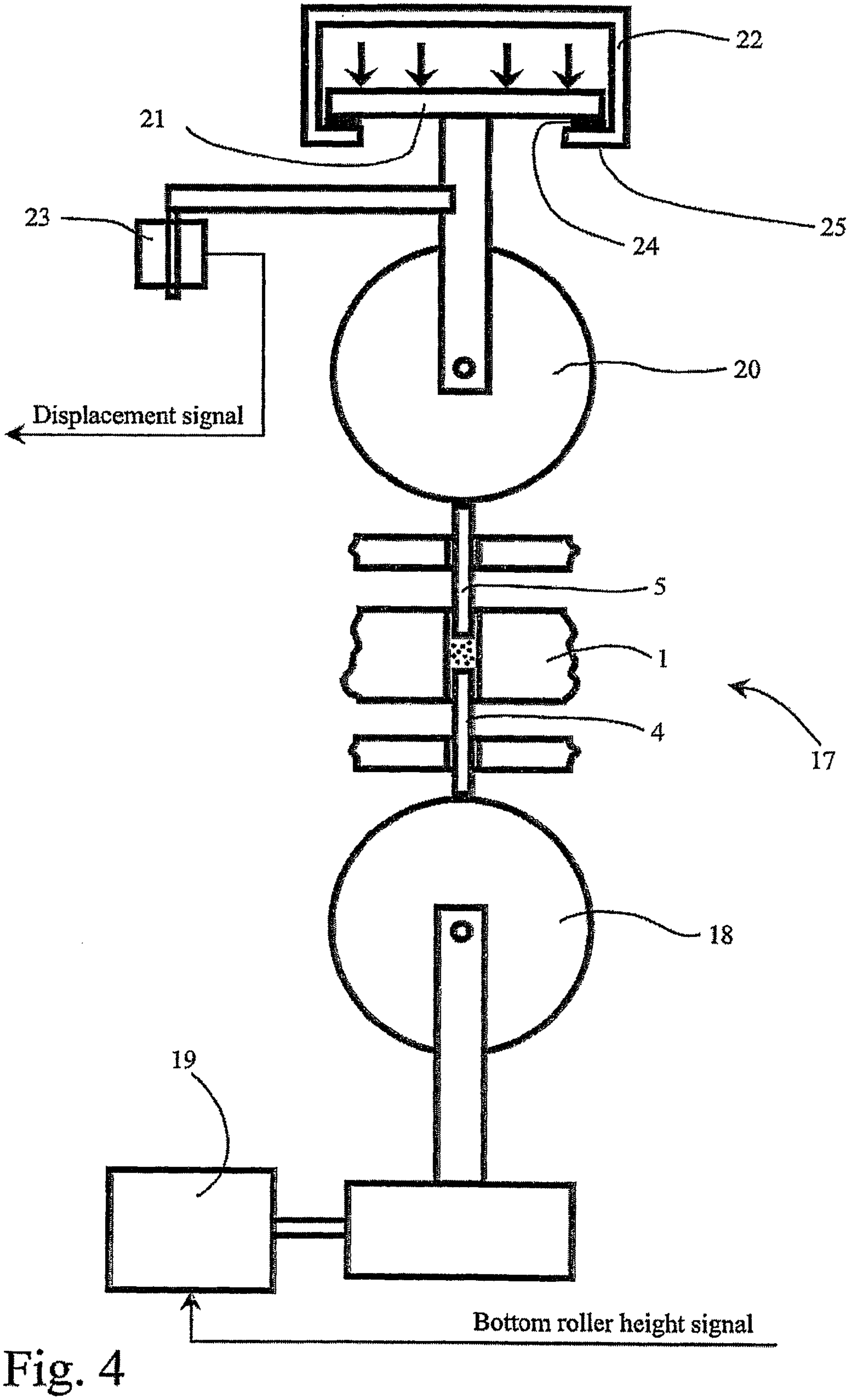
FIG. 4 is a side view of the main-compression station of FIG. 1.

FIG. 4 shows a main-compression station 17 comprising a lower compression roller 18 and an upper compression roller 20. The upper compression roller 20 is suspended in a piston 21 vertically displaceable within a gas cylinder 22. The gas pressure in the gas cylinder 22 is maintained constant by means of a not shown regulation system. As explained above regarding the pre-compression station, also the not shown regulation system of the main-compression station may comprise an air reservoir in order to maintain constant pressure. Because the compression is being performed with a constant force being applied to the upper punch 5 by means of the piston 21, the resulting hardness of the individual tablets will be substantially constant. Thereby, a substantially constant release profile and hence bioavailability of the produced tablets may be obtained.

The vertical position of the piston 21 is measured by means of a displacement transducer 23, such as a LVDT (Linear Variable Differential Transformer). When an upper punch 5 passes under the centre of the upper compression roller 20, the displacement transducer 23 measures a displacement substantially corresponding to the thickness of the tablet after the main-compression. The displacement measured by the displacement transducer 23 is also representative of the dwell time, that is, the period of time during which the tablet is compressed by the maximum constant compression force. At each main-compression of a tablet, the displacement measured by the displacement transducer 23 is transferred in the form of a displacement signal to the dwell time regulator and the control unit; see FIG. 1.

In the dwell time regulator, a rigid or floating mean value of the displacement signal for several consecutive tablets is compared with a second set value that corresponds to a calibrated desired tablet dwell time and is received from the control unit. If the deviation falls outside preset second correction tolerance limits, a bottom roller height signal is generated and transferred to the main-compression station 17. In the main-compression station 17, the bottom roller height signal is fed into a linear actuator 19, which adjusts the height of the bottom compression roller 18 correspondingly; see FIG. 4. In this way, the dwell time during main-compression of the individual tablets may be maintained substantially constant, and consequently the above-mentioned tablet properties dependent on the dwell time will also be substantially constant.

The dwell time regulation may counteract the tendency of the dwell time to change as a result of changing compacting properties of the material compressed in the die. Changing compacting properties may be the result of a change in the humidity, the temperature, and the mean particle size over a batch, etc. However, according to the invention, the dwell time regulation may be omitted, and satisfying tablet properties may nevertheless be obtained.

In the control unit, the hardness signal received from the automatic testing device is compared with the desired tablet hardness, and on the basis of the deviation between these values, a re-calibration may be performed by adjustment of the second set value supplied to the dwell time regulator by the control unit. Alternatively, said re-calibration could be performed by adjustment of the otherwise constant air pressure in the air cylinder 22 of the main-compression station 17.

Figure 5:
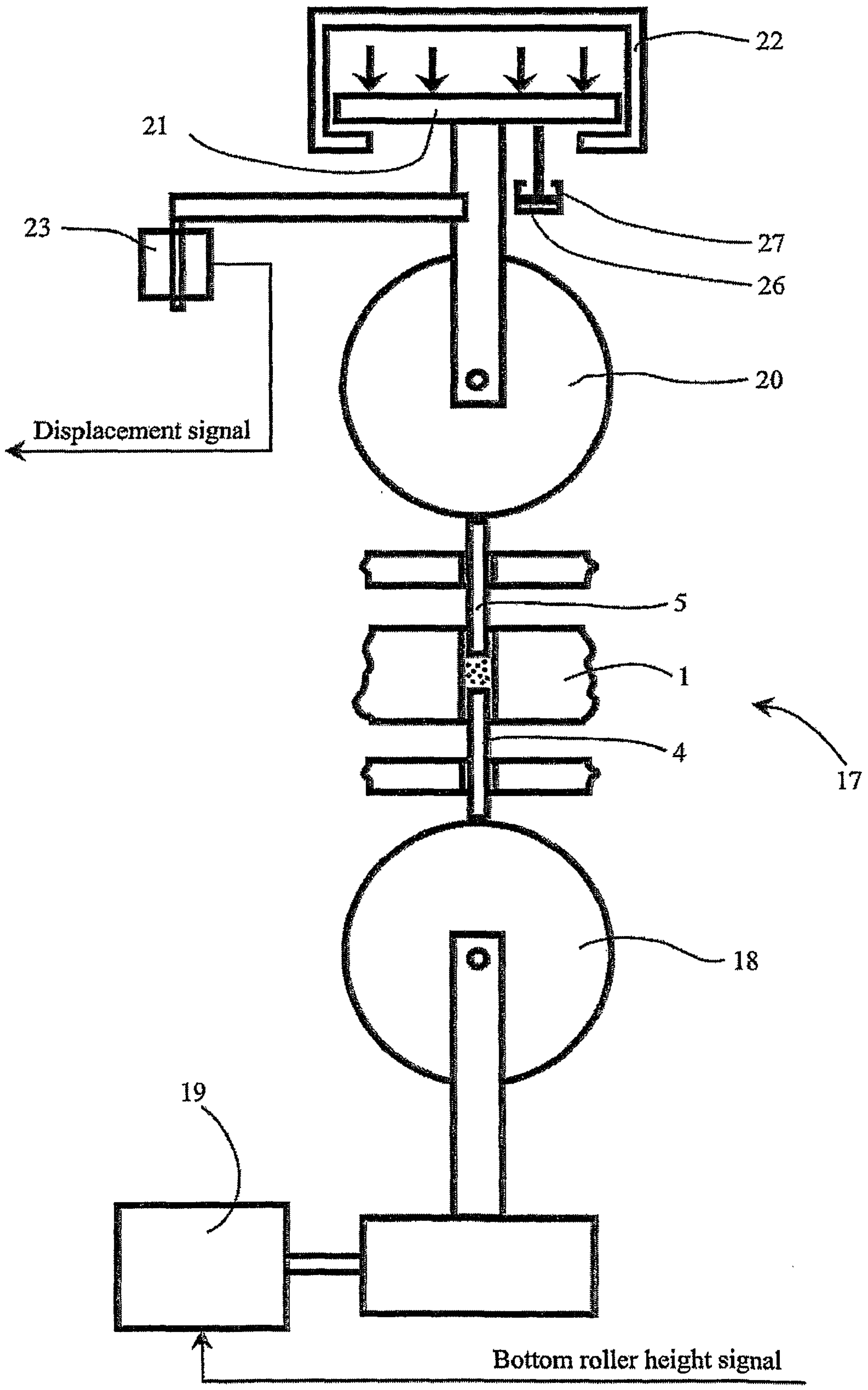
FIG. 5 is a side view of another embodiment of the main-compression station in FIG. 4.

As it is seen in FIG. 4, an elastic ring 24 having rectangular cross-section is located between the main-compression piston 21 and an abutment 24 in the form of an inwardly directed, lower shoulder 25 of the gas cylinder 22. The abutment 24 provides a dampening force for the piston 21, whereby the rotational speed of the die table may be increased without increasing noise and vibrations from the piston 21 and cylinder 22. This is especially advantageous in pharmaceutical tablet presses that generally run much faster than industrial presses. The dampening abutment 24 may have any other suitable configuration, for instance, a chamber containing compressed gas, a hollow ring of elastic material, a spring element, or an elastic O-ring. Furthermore, the dampening force for the piston 21 may be provided by a dampening piston 26 arranged in a cylinder 27 containing compressed gas, as it may be seen in FIG. 5. In order to further increase the rotational speed of the die table, the piston 21 may be made of a light weight material, such as titanium, for instance. Preferably the total weight of the piston 21 and other moving parts associated therewith does not exceed 40 kilos and preferably does not exceed 30 kilos. In addition, high-speed piston seals may be used for the piston 21 in order to further improve the rotational speed of the die table.

Obviously, the invention is equally applicable to so-called single-sided, double-sided or multi-sided tablet presses. For instance, in a double-sided press for the production of tablets having two layers, a first layer production section and a second layer production section, arranged along opposite sides of the die table, each has both a pre-compression station and a main-compression station. In this case, however, the first layer is compressed to a fixed thickness at main-compression in order to better be able to regulate the quantity of the second material supplied to each die. A substantially constant hardness of the entire tablet is obtained by performing the main-compression of the second layer under substantially constant compression force and variable resulting tablet thickness of the individual tablets, in the same way as explained above for a single-sided press. Similarly, in a press for production of tablets having more than two layers, the main-compression is performed under substantially constant compression force and variable resulting tablet thickness only for the last layer of the tablet. The other layers are compressed to a fixed thickness at main-compression.

In a double-sided press for the production of single layer tablets, two similar production sections each corresponding to that of a single-sided press are provided, arranged along opposite sides of the die table, and each has both a pre-compression station, a main-compression station, a feeding device, and a tablet discharge device. Each production section is provided with both a powder quantity regulator and a dwell time regulator.

The invention claimed is:

1. A method for controlling a tablet press, whereby powder or granular material is compressed in dies arranged circumferentially in a rotary die table by means of reciprocating punches, said method comprising the steps:

consecutively supplying a quantity of material to be compressed into each die, subjecting the quantity of material located in each die to a pre-compression and subsequently a main-compression, measuring a weight value of a parameter representative of the weight of the quantity of material fed into the die, regulating the quantity of material supplied to each die on the basis of a deviation between a previously measured weight value and a first set value, and measuring the weight value during pre-compression of the quantity of material located in each die, characterized in that the main-compression is performed under substantially constant compression force and variable resulting tablet thickness of the individual tablets, whereby the powder or granular material is compressed in the die between opposed first and second punches, each punch having first and second ends, whereby said first punch ends are received in the die, and said second punch ends, during main-compression, interact with first and second main-compression rollers, respectively, whereby, during the main-compression, the first main-compression roller is displaced in the axial direction of the punches and the second main-compression roller is fixed in said direction, and whereby the first main-compression roller is carried by the main-compression piston, whereby a main-compression displacement value representative of a displacement of the first main-compression roller during main-compression is measured, and the position of the second main-compression roller in said direction is regulated on the basis of a deviation between a previously measured main-compression displacement value and a second set value, whereby said position regulation of the second main-compression roller is based on a mean value of several single measured main-compression displacement values, whereby the position of the second main-compression roller is maintained constant as long as said mean value of the main-compression displacement value falls within preset correction tolerance limits, and whereby the position of the second main-compression roller is regulated so that the resulting main-compression displacement value is maintained substantially constant.

2. A method for controlling a tablet press according to claim 1, whereby the weight value corresponds substantially to a thickness of a tablet during pre-compression of said tablet under substantially constant compression force.

3. A method for controlling a tablet press according to claim 1, whereby the compression force of the pre-compression is maintained substantially constant by means of a pre-compression piston arranged displaceably in a gas cylinder, whereby the gas cylinder is supplied with compressed gas, and whereby the gas pressure in the gas cylinder is maintained substantially constant by means of a pressure regulator.

4. A method for controlling a tablet press according to claim 3, whereby the powder or granular material is compressed in the die between opposed first and second punches, each punch having first and second ends, whereby said first punch ends are received in the die, and said second punch ends, during pre-compression, interact with first and second pre-compression rollers, respectively, whereby, during the pre-compression, the first pre-compression roller is displaced in the axial direction of the punches and the second pre-compression roller is fixed in said direction, and whereby the first pre-compression roller is carried by the pre-compression piston.

5. A method for controlling a tablet press according to claim 4, whereby the weight value corresponds substantially to a pre-compression displacement value representative of a displacement of the first pre-compression roller during pre-compression.

6. A method for controlling a tablet press according to claim 1, whereby the weight value corresponds substantially to the maximum compression force exerted by a punch on a tablet during pre-compression of said tablet to a predetermined tablet thickness.

7. A method for controlling a tablet press according to claim 1, whereby the compression force of the main-compression is maintained substantially constant by means of a main-compression piston arranged displaceably in a gas cylinder, whereby the gas cylinder is supplied with compressed gas, and whereby the gas pressure in the gas cylinder is maintained substantially constant by means of a pressure regulator.

8. A method for controlling a tablet press according to claim 7, whereby the movement of the main-compression piston is stopped by a dampening force after each main-compression.

9. A method for controlling a tablet press according to claim 8, whereby the dampening force is produced by a chamber containing compressed gas.

10. A method for controlling a tablet press according to claim 9, whereby the chamber containing compressed gas is a hollow ring of elastic material located between the main-compression piston and an abutment.

11. A method for controlling a tablet press according to claim 8, whereby the dampening force is provided by a dampening piston arranged in a cylinder containing compressed gas.

12. A method for controlling a tablet press according to claim 8, whereby the dampening force is provided by a spring element.

13. A method for controlling a tablet press according to claim 8, whereby the dampening force is provided by an elastic O-ring located between the main-compression piston and an abutment.

14. A method for controlling a tablet press according to claim 8, whereby the dampening force is provided by an elastic ring having rectangular cross-section and being located between the main-compression piston and an abutment.

15. A method for controlling a tablet press, whereby powder or granular material is compressed in dies arranged circumferentially in a rotary die table by means of reciprocating punches, said method comprising the steps:

consecutively supplying a quantity of material to be compressed into each die;

subjecting the quantity of material located in each die to a pre-compression and subsequently a main-compression, wherein the main-compression is performed under substantially constant compression force and variable resulting tablet thickness of the individual tablets;

measuring a weight value of a parameter representative of the weight of the quantity of material fed into the die;

regulating the quantity of material supplied to each die on the basis of a deviation between a previously measured weight value and a first set value; and measuring the weight value during pre-compression of the quantity of material located in each die;

wherein the compression force of the main-compression is maintained substantially constant by means of a main-compression piston arranged displaceably in a gas cylinder, wherein the gas cylinder is supplied with compressed gas, wherein the gas pressure in the gas cylinder is maintained substantially constant by means of a pressure regulator and wherein the movement of the main-compression piston is stopped by a dampening force after each main-compression.

* * * * *